United States Patent [19]

Ericson et al.

[11] Patent Number: 5,669,469
[45] Date of Patent: Sep. 23, 1997

[54] INTEGRATED ELEVATOR DRIVE MACHINE AND BRAKE ASSEMBLY

[75] Inventors: Richard J. Ericson, Southington; Anthony Cooney, Unionville, both of Conn.

[73] Assignee: Otis Elevator Company, Farmington, Conn.

[21] Appl. No.: 415,829

[22] Filed: Apr. 3, 1995

[51] Int. Cl.$^6$ ........................................... B66B 11/04
[52] U.S. Cl. ..................... 188/171; 188/71.5; 187/254
[58] Field of Search ........................... 187/254, 288; 188/71.1, 71.5, 171; 254/375, 378

[56] References Cited

U.S. PATENT DOCUMENTS

| | | | |
|---|---|---|---|
| 2,214,807 | 9/1940 | Buckley | 188/171 |
| 2,461,759 | 2/1949 | Nelson et al. | 188/171 |
| 2,543,830 | 3/1951 | Burrus et al. | 188/171 |
| 2,974,756 | 3/1961 | Roehm | 188/171 |
| 3,642,104 | 2/1972 | Schäfer | 188/171 X |
| 3,752,267 | 8/1973 | Dovell et al. | 188/171 |
| 4,436,139 | 3/1984 | Strader | 164/112 |
| 4,684,838 | 8/1987 | Casanova | 310/93 |
| 5,067,593 | 11/1991 | Tanaka et al. | 188/71.1 X |
| 5,101,939 | 4/1992 | Sheridan | 188/171 |
| 5,121,018 | 6/1992 | Oldakowski | 310/77 |
| 5,201,821 | 4/1993 | Ericson et al. | 187/20 |
| 5,202,539 | 4/1993 | Lamb | 188/180 X |
| 5,226,508 | 7/1993 | Ericson et al. | 187/73 |

FOREIGN PATENT DOCUMENTS

| | | |
|---|---|---|
| 0541906 | 5/1993 | European Pat. Off. . |
| 1133659 | 9/1990 | Japan . |
| 8802324 | 4/1988 | WIPO ............... 188/71.5 |

*Primary Examiner*—James W. Keenan

[57] ABSTRACT

An elevator machine having an outer wall, a rotatable output shaft with a sheave mounted thereon and a brake assembly for braking the output shaft and sheave. The brake assembly has a base integrally formed with the outer wall adjacent the output shaft. A metal base of the brake assembly is cast or embedded within the outer wall. Alternately, the outer wall forms the base of the brake assembly. The integrally formed base has a groove for housing a magnetic coil of a disc brake assembly. The base also has a plurality of bores for housing the brake springs and a plurality of bores for bolting the disc subassembly to the base. The disk brake assembly is fabricated by casting or imbedding a metallic blank of higher magnetic permeability into the casting of the outer wall to form the base thereof. A bearing assembly counterbore is machined into the outer wall and, without unsecuring the wall segment from the machining operation, the base of the disc brake assembly is machined to form the groove for housing a magnetic coil, a plurality of bores to house the brake springs and a plurality of bolt bores.

14 Claims, 2 Drawing Sheets

INTEGRATED ELEVATOR DRIVE MACHINE AND BRAKE ASSEMBLY

TECHNICAL FIELD

This invention relates to a brake assembly for an elevator drive machine and more particularly to an integrated elevator drive machine disc brake assembly and method of fabrication.

BACKGROUND OF THE INVENTION

Elevators are presently provided with a plurality of braking devices which are designed for use in normal operation of the elevator such as holding the cab in place when it stops at a landing and for use in emergency situations such as stopping the cab and/or counterweight from plunging into the hoistway pit.

The normal operational brakes on geared elevator drive machines are typically drum brakes which engage the machine input shaft to hold the latter against rotation when the cab is stopped at a floor. Disc brakes have been added to provide braking on the output shaft. Heretofore, disc brakes on the output shaft were utilized in addition to input shaft brakes so that the elevator drive machine had both input shaft brakes and output shaft brakes. Commonly assigned U.S. Pat. No. 5,226,508 entitled Disc Brake for Elevator Drive Sheave and granted Jul. 13, 1993 to R. Ericson et al. discloses a disc brake assembly for retrofit mounting to the output shaft and sheave of an existing elevator drive machine which has input shaft brakes. Commonly assigned U.S. Pat. No. 5,201,821 entitled Disc Brake Elevator Sheave granted Apr. 13, 1993 to R. Ericson et al. discloses a disc brake assembly for incorporation in new equipment elevator machines which have input shaft brakes. It would be desirable to provide a new and improved output shaft disc brake assembly which obviates the need for input shaft brakes.

DISCLOSURE OF THE INVENTION

It is an object of the present invention to provide a new and improved elevator drive machine having output shaft braking without input shaft braking.

A further object of the invention is to provide an integrated elevator drive machine and output shaft brake assembly.

Another object of the invention is to provide such an integrated brake assembly which is cost efficient to manufacture and reduces the number of component parts.

A further object of the invention is to provide such a brake assembly which is easy and convenient to service.

A still further object of the invention is to provide a new and improved method of manufacture of such an integrated brake assembly.

A still further object of the invention is to provide an integrated disc brake assembly and method of manufacture that may be utilized in both worm gear and helical gear elevator drive machines as well as gearless elevator drive machines.

Other objects will be in part obvious and in part pointed out more in detail hereinafter.

Accordingly, it has been found that the foregoing and related objects are attained and disadvantages of the prior art are overcome in an elevator drive machine having a machine housing with an outer wall, a rotatable output shaft with a sheave mounted on it for rotation therewith and a brake assembly for braking the output shaft and sheave. The brake assembly has a base integrally formed with the outer wall of the machine housing adjacent the output shaft. The machine housing may be a casting and the metal base of the brake assembly is cast or embedded within the casting of the outer wall of the housing. Alternately, the outer wall of the machine housing is configured so that a predetermined portion of the casting of the outer wall forms the base of the brake assembly. The integrally formed base has a groove for housing the magnetic coil of a disc brake assembly. The base also has a plurality of bores for housing the brake springs and a plurality of bores for bolting the disc subassembly to the base.

In the method of fabrication of the present invention, an outer wall segment of the drive machine housing is cast to form a base of the brake assembly. In casting the outer wall segment to form a base of the brake assembly, a metal blank of higher magnetic permeability is cast or embedded into the casting of the outer wall segment and is machined to form the base. Alternately, the casting of the outer wall segment may be dimensioned and configured so that the casting of the outer wall segment itself forms the base. The outer wall segment is secured for machining a bearing assembly counterbore and, without unsecuring the wall segment from the machining operation, the base of the disc brake assembly is machined to form the groove for housing a magnetic coil, a plurality of bores to house the brake springs and a plurality of bolt bores. Precise relative alignment of the grooves, spring bores, stud bores, and bearing assembly counterbore is efficiently achieved by contemporaneous machining operations.

BEST MODE FOR CARRYING OUT THE INVENTION

Figure 1:
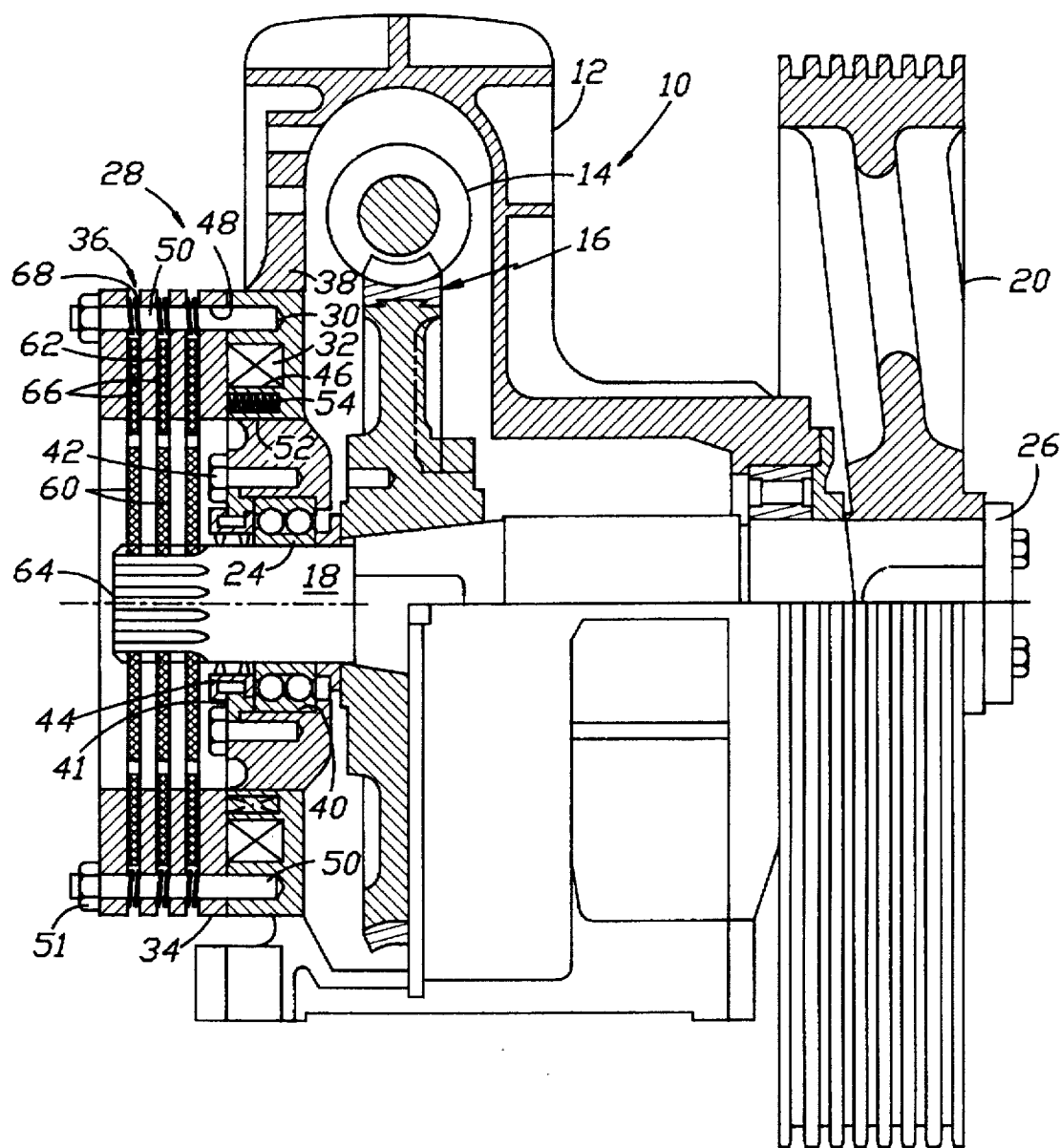
FIG. 1 is a sectional view of a worm gear elevator drive machine and integrated brake assembly in accordance with the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, a worm gear elevator drive machine is shown and generally designated by the numeral 10. The machine 10 generally comprises a machine or gear box housing 12, worm gear 14, worm wheel 16, output shaft 18 and drive sheave 20. The worm gear 14 meshes with the worm wheel 16 which is keyed directly to the output shaft 18. The shaft 18 is journaled in bearings 24 mounted in the walls of the housing 12. It is understood that the worm gear 14 is driven by an electric motor (not shown) which in turn drives the worm wheel 16 and output shaft 18. The drive sheave 20 is mounted on and keyed to the output shaft 18 and carries the elevator and counterweight cables. The cover plate 26 is mounted on the end of the output shaft 18 to hold the sheave 20 in place on the shaft 18. The above-described components are generally conventional to worm gear elevator drive assemblies.

The machine 10 also includes an integrated disc brake assembly generally designated by the numeral 28 which comprises a base 30, a magnetic coil 32, an armature plate 34 and a disc subassembly 36.

The base 30 is integrally formed with the outer wall section 38 of the machine or gear box housing 12. In the illustrated embodiment, the outer wall section 38 is cast iron and the base 30 is a steel blank which is cast or embedded directly into the wall section 38 and then machined into the configuration shown in FIG. 1 as described in detail hereinafter. The bearings 24 are mounted within a counterbore 40 in the base 30. The bearings 24 are held in place in the counterbore 40 by a bearing retainer cover 41 which is fixed to the base 30 by bolts 42. A double lip seal 44 mounted to the cover 41 sealingly engages the output shaft 18 to seal the bearings 24.

The base 30 has an outwardly opening U-shaped annular groove 46 concentric about the counterbore 40 and configured to house the magnetic coil 32. The base 30 also contains a plurality of threaded stud bores 48 for receiving studs 50, spring bores 52 for housing springs 54, and dowel bores 56 for receiving dowels 58. The magnetic coil 32 is housed within the annular groove 46 and bonded therein by an adhesive or bonding agent such as an epoxy resin. In machining the groove 46, the walls forming the groove are preferably rough cut to facilitate bonding of the coil within the groove 46. Alternately, the coil 32 may be keyed to the groove 46 to lock the coil in place. Other types of suitable securement are also acceptable.

The armature plate 34 is disposed adjacent the magnetic coil 32 and the disc subassembly 36. The disc subassembly 36 is bolted to the base 30 by (four) studs 50 and nuts 51 and comprises a plurality of interleaved friction discs 60 and brake plates 62. The outer end of each friction disc carries an annular radially outwardly extending friction pad 66. The friction discs 60 are mounted directly to the shaft 18 for rotation by the shaft 18. The outer end of the output shaft 18 has a plurality of axially extending splines 64 and the inner ends of the friction discs 60 are splined directly to the splines 64 so that the output shaft rotates the discs 60.

Figure 2:
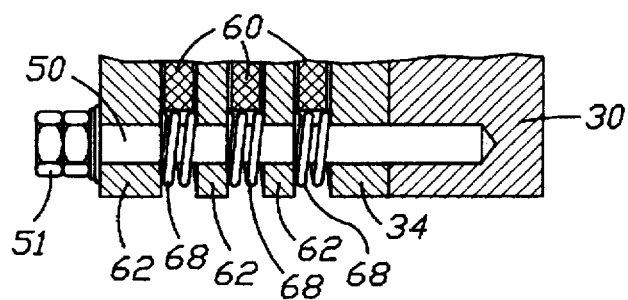
FIG. 2 is a fragmented sectional view of the disc brake assembly of FIG. 1.

The armature plate 34 is biased away from the magnetic coil 32 by a plurality of coil springs 54 mounted in base 30. The brake plates 62 are biased apart by a plurality of light coil springs 68 mounted on the studs 50 which extend through the armature plate 34 and the brake plates 62 (FIG. 2). The brake plates 62 are thus held away from the interleaving friction discs 60 by the coil springs 68 when the brake assembly is "off". The nuts 51 are threaded onto the ends of the studs 50 so as to allow for adjustment of the spacing between the plates 62 to account for wear on the brake during its useful life. A plurality of guide dowels 58 (not shown in FIG. 1) dispersed circumferentially about the brake assembly 28 extend from the base 30 through the armature plate 34 and brake plates 62 to guide axial movement of these components relative to each other when the brake is set and released. It will be appreciated from the above that the discs 60 rotate with the output shaft and sheave 20, while the plates 62 remain relatively stationary. The multiple coil springs 68 produce several useful advantages for elevator drive machines. First, a multiple spring configuration makes it easier to equalize the pressure on the brake discs, thereby reducing brake disc wear and minimizing overheating of the brake due to unequalized pressures. Second, this configuration simplifies the setting of the braking force for different elevator duties. Third, it enhances safety for the elevator drive machine. If a spring degrades, braking ability is not lost. This enhanced safety feature is extremely important in elevator operation.

The brake assembly described above operates as follows. During normal safe operation of the elevator, the coil 32 is energized, and the armature plate 34 is magnetically held against the base 30 causing the actuating springs 54 to be compressed. The brake assembly 28 is thus in a "release" mode, and the friction discs 60 will be free to rotate with the shaft 18 uninhibited by the plates 62. When braking is required, such as in the event of an unsafe operating episode, e.g., the occurrence of overspeed in either direction, power to the coil 32 will be switched off, and the coil 32 will deenergize. The actuating springs 54 will then move the armature plate 34 away from the base 30 and toward the annular brake plates 62. The force of the springs 54 is such that the spacer springs 68 will be compressed and the plates 62 will clamp the discs 60 against further movement. Movement of the output shaft 18 and sheave 20 will thus be interrupted and the cab will stop its movement in the hoistway. At the same time, power to the machine will be interrupted. After the cause of the unsafe cab movement has been discovered, the brake assembly 28 can be released merely by restoring power to the coil 32. The brake assembly is similarly operable for normal braking as well as additional unsafe conditions such as to protect against uncontrolled low speed movement of the elevator. Further general descriptions of the operation and structure of an elevator drive machine and disc brakes are found in the above-identified U.S. Pat. No. 5,201,821 and U.S. Pat. No. 5,226,508 which are incorporated herein by reference.

As can be appreciated, the disc brake assembly is easily disassembled for servicing in the field by removal of the four nuts 51. The discs are splined directly to the outer end of the output shaft and no jacking of the output shaft is required to service the brake discs. Brake air gap adjustment is easy to accomplish using a feeler gauge and wrench. In this regard, an air gap of 0.5 mm is possible which greatly reduces the noise level due to normal operation of the brake.

In the illustrated embodiment, the outer wall segment 38 of housing 12 is cast iron and the integral base 30 is preferably steel for enhanced magnetic permeability. Other metals which provide acceptable magnetic permeability characteristics may also be utilized for the base 30. In the method of fabrication of the present invention, a steel blank for forming base 30 is cast or embedded directly into the wall segment 38 during the casting of wall segment 38. The wall segment 38 is then secured or bolted down for machining the bearing counterbore 40. The annular U-shaped groove 46 for housing the magnetic coil 32 is cut in the steel blank concentrically about the counterbore 40. The side walls of the U-shaped groove 46 are preferably rough cut to provide an enhanced bonding surface for the adhesive utilized in bonding the coil 32 within the groove 46. At this time, the stud bores 48, the spring bores 52, and the dowel bores 56 are drilled in the blank to form the base 30. Upon completion of the machining process, the wall section 38 is then unsecured and removed from the cutting machine and thereafter the magnetic coil is fitted within the groove 46 and bonded in place by a suitable adhesive or bonding agent such as an epoxy resin. The preferred method of fabrication is to insert the magnetic coil into groove 46 and coat the magnetic coil with epoxy resin and cause it to cure thereby bonding the coil in the groove.

Alternately, the blank for forming base 30 may be omitted and the outer wall portion 38 is cast to a predetermined configuration to form a base for the disc brake assembly. In this configuration, the cast iron wall section 38 would form the base 30 and would be machined as described above to provide the annular groove 46, the threaded stud bores 48, the spring bores 32, the dowel bores 56 and the bearing counterbore 40. The dimensions and configuration of the base 30 will be determined so as to provide an acceptable magnetic flux path through the cast iron base 30.

Figure 3:
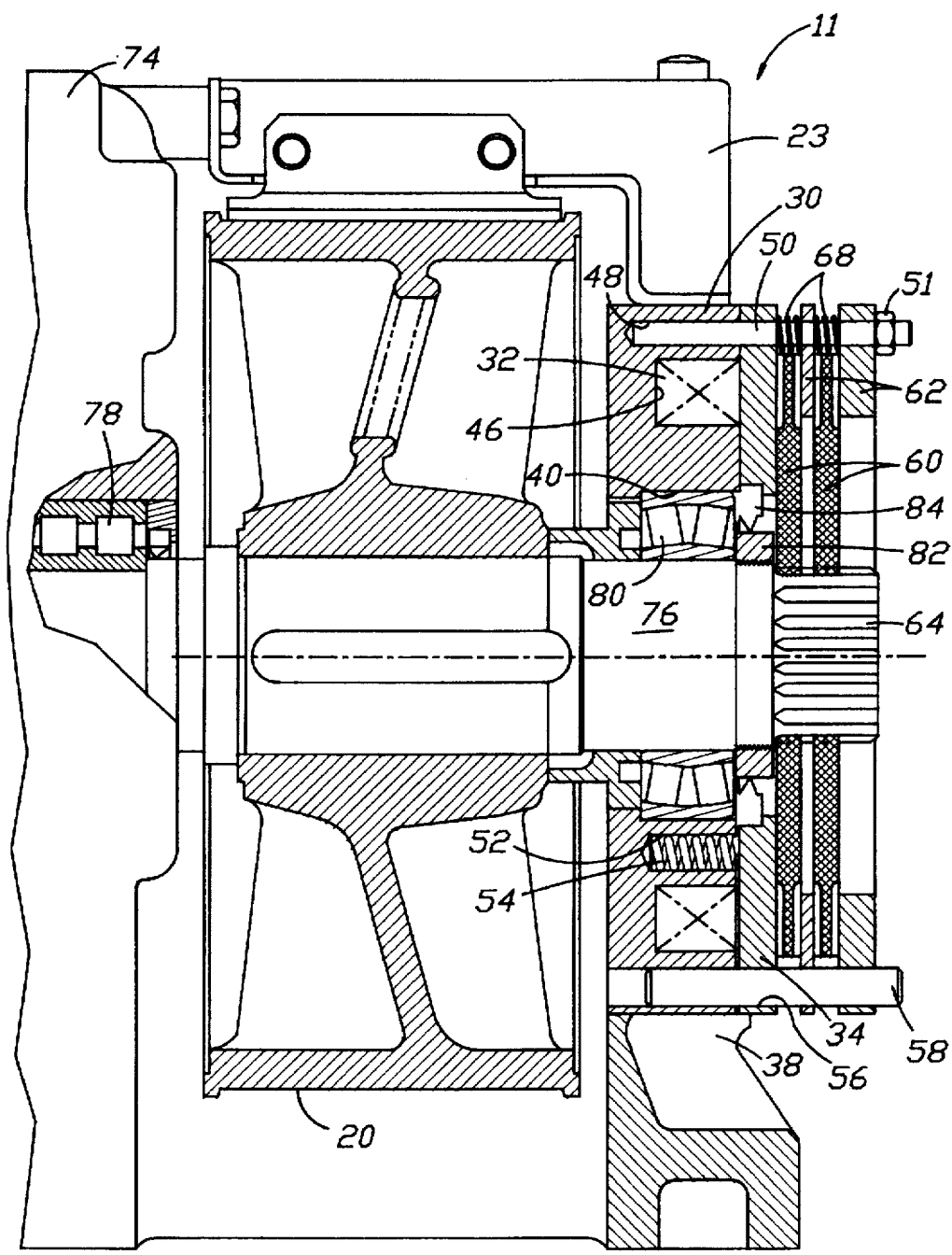
FIG. 3 is a broken-away sectional view of a helical gear elevator drive machine.

Referring to FIG. 3 wherein identical numerals are utilized to identify like or similar parts, the integrated brake assembly of the present invention is shown in a helical gear elevator drive machine generally designated by the numeral 11. As known in the art, the elevator drive machine 11 has a helical gear drive assembly 74 (not shown in detail) driving an output shaft 76 with a sheave 20 simply supported by bearing assemblies 78, 80 disposed on opposite sides of the sheave 20. The housing 23 of machine 11 includes an outer wall segment 38 referred to as a bearing stand. Similar to machine 10, the base 30 is integrally formed in the wall segment 38. The base 30 has a bearing counterbore 40 housing the bearing assembly 80. A retaining nut 82 is threadably mounted on the output shaft 76 to hold the bearing assembly 80 in the counterbore 40. An annular seal 84 is mounted on the armature plate 34 and sealingly engages the outer circumferal surface of the retaining nut 82 to seal the bearing assembly 80. The remaining components as indicated by identifying numerals in FIG. 3 are similarly configured and assembled as described in relation to FIG. 1 and need not be described in further detail for purposes of the alternate embodiment. Similarly, the wall segment 38 and the base 30 are integrally formed and fabricated in accordance with the above-described method of fabrication. Additionally, the integrated disc brake of the present invention may also be utilized in a gearless elevator drive machine having a simply supported sheave as illustrated in the drive machine 11 of FIG. 3.

As can be appreciated from the foregoing, a new and improved elevator drive machine and integrated disc brake assembly has been described. The integrated brake assembly is cost efficient to manufacture, reduces the number of component parts as compared to the prior art and is easy and convenient to service. In addition, a new and improved method of fabricating such an integrated brake assembly has also been described.

As will be apparent to persons skilled in the art, various modifications and adaptations of the structure above described will become readily apparent without departure from the spirit and scope of the invention, the scope of which is defined in the appended claim.

What is claimed is:

1. An elevator drive machine comprising:

a machine housing having an outer wall;

a rotatable output shaft mounted in said machine housing;

a sheave mounted on said output shaft and rotatable therewith; and a brake assembly configured for braking said output shaft, said brake assembly having a base integrally formed with said outer wall of said machine housing adjacent said output shaft, wherein said outer wall of said machine housing is a casting and said base of said brake assembly is cast within said outer wall, and wherein said base comprises material having a higher magnetic permeability than said casting of said outer wall.

2. The device of claim 1 wherein said brake assembly has a magnetic brake coil and said base has a groove housing said brake coil.

3. The device of claim 2 wherein said groove is an annular groove about said output shaft.

4. The device of claim 2 wherein said brake assembly is a disc brake assembly having a disc subassembly bolted to said base and a plurality of springs biasing an armature plate and said base has a plurality of bores housing said plurality of springs.

5. The device of claim 1 wherein said base is steel.

6. The device of claim 5 wherein said outer wall is cast iron.

7. The device of claim 1 wherein a predetermined section of said outer wall adjacent said output shaft is dimensioned and configured to form said base of said brake assembly, wherein the dimensions and configuration of the base are constructed so as to provide an acceptable magnetic flux path through the base.

8. The device of claim 7 wherein said brake assembly has a magnetic brake coil and said base has a groove housing said brake portion.

9. The device of claim 8 wherein said groove is an annular groove about said output shaft.

10. The device of claim 7 wherein said brake assembly is a disc brake assembly having a disc subassembly bolted to said base and a plurality of springs biasing an armature plate and said base has a plurality of bores housing said plurality of springs.

11. The device of claim 7 wherein said outer wall is cast iron.

12. The device of claim 11 wherein said sheave mounted on said output shaft is simply supported by first and second bearing assemblies disposed on opposite sides of said sheave and said outer wall of said machine housing is configured to form a bearing stand mounting said first bearing assembly.

13. The device of claim 12 wherein said elevator drive machine further comprises a helical drive assembly for rotating said output shaft.

14. The device of claim 11 wherein said elevator drive machine further comprises a worm gear drive assembly for rotating said output shaft with said outer wall of said machine housing forming a gearbox housing for said worm gear drive assembly.

* * * * *